UNITED STATES PATENT OFFICE.

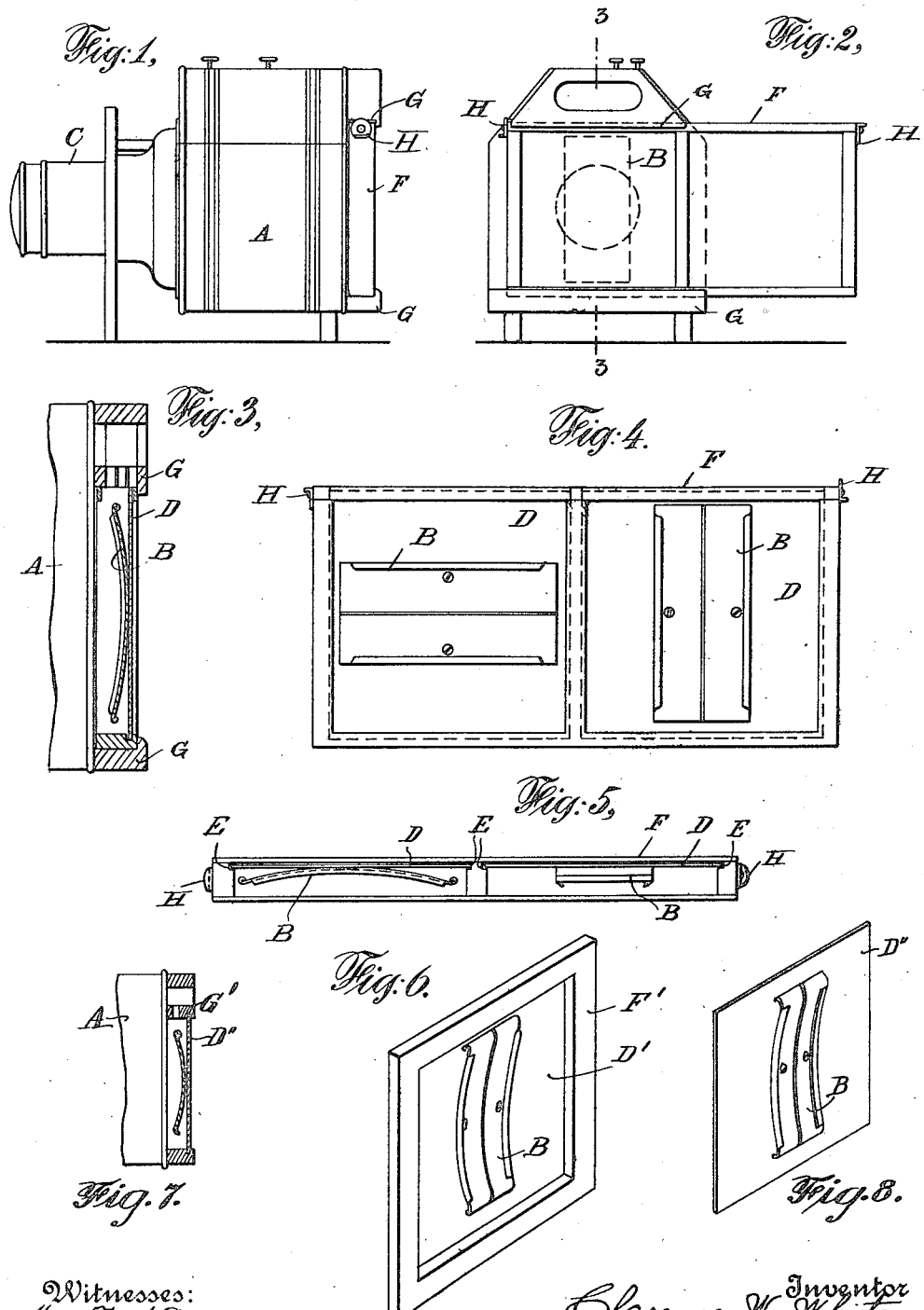

CLARENCE W. WHITE, OF NORTH BENNINGTON, VERMONT.

PROJECTING APPARATUS.

1,124,367.

Specification of Letters Patent. Patented Jan. 12, 1915.

Application filed January 30, 1913. Serial No. 745,128.

*To all whom it may concern:*

Be it known that I, CLARENCE W. WHITE, a citizen of the United States, and a resident of North Bennington, in the county of Bennington and State of Vermont, have invented certain new and useful Projecting Apparatus, of which the following is a specification.

This invention relates to picture projecting apparatus, and particularly to apparatus adapted to project by reflection opaque pictures placed within the apparatus, and the objects of the invention are to improve the construction of said picture projecting apparatus by providing the same with a new and useful picture holding device for holding the pictures to be projected by means of the apparatus.

To the accomplishment of the above objects, and to such others as may hereinafter appear, the invention comprises a picture projecting apparatus provided with an adjustable picture holding device which is also reversible.

While the invention is to be described with particular reference to the details of construction, it is not to be considered as limited thereto, as many changes may be made and still fall within the scope of the appended claims.

In the drawings: Figure 1 is a side view of a projecting apparatus, embodying the invention. Fig. 2 is a rear view of Fig. 1. Fig. 3 is a section of the holder and guides taken on the line 3—3 of Fig. 2. Fig. 4 is a side view of the double holder shown in Figs. 1 and 2 and Fig. 5 is a top view of the same. Fig. 6 is a perspective view of a single holder. Fig. 7 is a side view similar to Fig. 1 with parts broken away showing means for holding an alternate form of holders. Fig. 8 is a perspective view of an alternate form of single holder.

In the drawings A designates the body of a projecting apparatus such as, for example, that shown in U. S. Patent No. 993,425. The same being provided in the interior with suitable lights and reflectors (not shown) which throw the rays of light upon the picture holder B and then out through the lens tube C as is common with this kind of apparatus.

In the present instance the picture holder B is secured to a holder-plate D which is removably held in grooves E of the holder-frame F. The holder-frame F shown in Figs. 1–4 is arranged to hold two holder plates D, the holder-frame being arranged to slide in guides G on the back of the projecting apparatus. Suitable adjustable stops H are provided on the ends of the holder-frame to limit the movement of the frame. The stops H in the present instance have a turned up end which permits of the stops being turned to permit of the holder-frame being removed from the guides G.

It will be noticed that the holder-plates D are made square, this permits of the same being removed from the holder-frame and reinserted in a position to place the picture holder B in either a horizontal or vertical position to permit of projecting picture cards that are right side up in either position.

The holder-frame is made double as shown in Figs. 1–4 inclusive to permit of a picture card being held in position in one of the holders to be projected, while the other holder is in position to be removed, and another picture card inserted, in either a horizontal or vertical position in the frame, whereupon the frame can be moved to the right or left and the other holder removed, and so on.

Instead of the holder-frame being made double, the same can be made as shown in Fig. 6, in which case the holder-plate D' is secured to the frame F' the frame being adapted to be held in the guides G of the apparatus.

When only a single holder is provided the frame F' can be dispensed with and the guides G made small enough to fit the holder-plate D', as shown in Figs. 7 and 8 in which the holder plate is marked D'', and the guides G', the holder plate being slidable in said guides and being arranged to be held in said guides either horizontally or vertically.

The holders B in each instance are preferably made adjustable so that the same can be made to hold pictures of different widths.

From the above it will be seen that picture cards taken either crosswise or lengthwise the greatest length of the card can be displayed in the holder by simply making the holder-plate square and removable so that the same can be inserted in either position in the apparatus. This construction is a very simple one and permits of the easy insertion of the picture cards without jarring or damaging the machine which often happens when the holder is pivoted to the back of the machine, as in certain prior constructions, in which the holder-plate is not readily removable or reversible, in which case the holder becomes hot and hard to manipulate.

The present construction permits of easy change of pictures, is noiseless in operation, insertion and removal of pictures does not jar the apparatus as the pictures are inserted or removed when the holder is entirely out of the apparatus, the holder being securely fastened to the holder-plate cannot get out of alinement which is often the case in pivoted reversible card holders, and there is nothing to wear out or become loose.

What I claim is:—

1. A projecting apparatus comprising a body and a holder-plate carrying a picture holder and arranged to be secured to said body in either of two positions, in one of which positions the main dimension of the picture holder is vertical, and in the other of which positions said main dimension is horizontal, means arranged to hold said holder-plate to the body in either of such two positions, and to permit the holder-plate to be changed from the one position to the other.

2. A projecting apparatus comprising a body, and a holder-frame, two holder-plates each carrying a picture holder, each holder-plate arranged to be held in said holder-frame in either of two positions, in one of which positions the main dimension of the picture holder is vertical, and in the other of which positions said main dimension is horizontal, means arranged to hold said holder-frame to the body to permit of either holder being brought into operating position.

3. A projecting apparatus comprising a body, a holder frame slidable in said body, two square holder plates each carrying a picture holder, each holder plate arranged to be held in said holder frame in either of two positions, in one of which positions the main dimension of the picture holder is vertical, and in the other of which positions said main dimension is horizontal, and guideways arranged in said body to hold said holder frame slidably and to permit of either holder being brought into operating position.

In testimnoy whereof I have signed this specification in the presence of two subscribing witnesses.

CLARENCE W. WHITE.

Witnesses:
V. C. EDGERTON,
IRVING C. COBB.